(12) United States Patent  
Sagawe

(10) Patent No.: US 8,852,440 B2  
(45) Date of Patent: Oct. 7, 2014

(54) FILTER UNIT AND METHOD FOR OPERATING THE FILTER UNIT

(75) Inventor: Joachim Sagawe, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/984,585

(22) PCT Filed: Jan. 4, 2012

(86) PCT No.: PCT/EP2012/050067  
§ 371 (c)(1),  
(2), (4) Date: Aug. 9, 2013

(87) PCT Pub. No.: WO2012/110260  
PCT Pub. Date: Aug. 23, 2012

(65) Prior Publication Data  
US 2013/0313203 A1    Nov. 28, 2013

(30) Foreign Application Priority Data  
Feb. 18, 2011 (DE) .......................... 10 2011 004 367

(51) Int. Cl.  
*B01D 35/12* (2006.01)

(52) U.S. Cl.  
CPC ..................................... *B01D 35/12* (2013.01)  
USPC ............. 210/741; 210/90; 210/100; 210/132; 210/340; 210/767

(58) Field of Classification Search  
CPC ........... B01D 29/0047; B01D 29/0072; B01D 29/606; B01D 33/0064; B01D 35/1435  
USPC ............. 210/741, 767, 85, 106, 90, 100, 132, 210/340, 341  
See application file for complete search history.

(56) References Cited

U.S. PATENT DOCUMENTS 6,888,466 B2 * 5/2005 Dermody ....................... 340/607  
7,279,091 B2 * 10/2007 Sann et al. .................... 210/130  
(Continued)

FOREIGN PATENT DOCUMENTS

DE    1 977 428    1/1968  
DE    88 05 945 U1    7/1988  
(Continued)

OTHER PUBLICATIONS

International Search Report for corresponding application PCT/EP2012/050067 mailed on Mar. 27, 2012.

(Continued)

*Primary Examiner* — Matthew O Savage  
*Assistant Examiner* — Akash Varma  
(74) *Attorney, Agent, or Firm* — Davis & Bujold, PLLC; Michael J. Bujold

(57) ABSTRACT

A filter unit comprising an inlet (12) and an outlet (13) for a flow medium to be filtered, a first filter cartridge (14) having a first filter element, a second filter cartridge (15) having a second filter element, and a switching device (16) which allows alternating filter operation of the first or the second filter cartridge (14, 15). It is proposed that the first filter cartridge be a main cartridge (14) with a fine first filter element and the second filter cartridge be an auxiliary cartridge (15) with a coarse second filter element. The pressure loss in the auxiliary cartridge (15) is set to the same threshold value as a contaminated main cartridge (14), at which the differential pressure switch triggers an alarm such that during changing of the main filter, the alarm continuously sounds and is only switched off after changing the filtering back to a fine filtering operation.

10 Claims, 3 Drawing Sheets

(56) References Cited

U.S. PATENT DOCUMENTS

| | | | |
|---|---|---|---|
| 7,618,480 B2 * | 11/2009 | Barnwell | 95/273 |
| 2006/0162302 A1 * | 7/2006 | Terrell | 55/385.1 |

FOREIGN PATENT DOCUMENTS

| | | | |
|---|---|---|---|
| DE | 44 24 810 A1 | 1/1996 | |
| GB | 258 905 | 1/1927 | |
| GB | 1023178 | 3/1966 | |
| GB | 1 164 628 | 9/1969 | |
| GB | 1164628 * | 11/1969 | B01D 35/12 |

OTHER PUBLICATIONS

Written Opinion for corresponding application PCT/EP2012/050067 mailed on Mar. 27, 2012.

German Search Report for corresponding application de 10 2011 004 367.5 mailed on Jul. 14, 2011.

* cited by examiner

FILTER UNIT AND METHOD FOR OPERATING THE FILTER UNIT

This application is a national stage completion of PCT/EP2012/050067 filed Jan. 4, 2012 which claims priority from German application serial no. 10 2011 004 367.5 filed Feb. 18, 2011.

FIELD OF THE INVENTION

The invention relates to a filter unit and to a method for operating the filter unit.

BACKGROUND OF THE INVENTION

Filter units, having two filter cartridges, are known as so-called duplex filters and are used particularly as lubricating oil filters for marine transmissions. Here, there is the technical regulation that it must be possible to perform a filter change with the machine running. For this case, a switching device is provided by means of which one filter is switched off and the other filter has a flow passing through it. In the meantime, the shut off filter can be exchanged. Due to the two identical filter cartridges, such duplex filters are relatively large, heavy and expensive.

So-called gap-type filters are also known that do not need to be exchanged because they can be cleaned during operation. A disadvantage with the gap-type filters is that a maximum grade of filtration cannot be attained. The gap-type filter has a grade of filtration limit of approximately 50 µm. The grade of filtration is determined by the gap width; there is no filtering in the depth, rather filtration occurs only in a filter plane.

The GB 1,164,628 document discloses a duplex filter for a marine transmission, thus a lubricating oil filter. Such known duplex filters have two identical filter cartridges, which can be populated with different filter elements, for example, with a paper filter element or fine filter element, or a coarse filter element in the form of a sieve filter. Here, the fine filter is provided for the time period during which the marine machine is being broken-in. After this initial break-in phase, the fine filter is replaced by the coarse filter, a fine filter is no longer used after the initial break-in phase. The exchange from the fine filter to the coarse filter occurs by actuating a switching device, which allows the exchange of the fine filter cartridge while the machine is running.

SUMMARY OF THE INVENTION

The problem addressed by the present invention is to provide a filter unit of the initially named type, which allows a filter exchange with the machine running, however, is designed having less volume, and a smaller construction space is required for the installation.

According to a first aspect of the invention, a main cartridge and an auxiliary cartridge are provided, wherein the auxiliary cartridge is substantially smaller with respect to its outer dimensions than the main cartridge. A fine filter element provided in the main cartridge is intended for the continuous operation. In contrast, a coarse filter is provided in the auxiliary cartridge that is required only for the time during which the main cartridge is exchanged. However, during exchange of the main filter (due to contamination), which typically takes only a few minutes, the lubricating oil is only cleaned via a coarse filter. However, a relative impurity of the lubricating oil, with the smallest particles which cannot be retained by the coarse filter, can be acceptable because after the filter is exchanged, the lubricating oil is again cleaned using the fine filter. Due to the smaller auxiliary cartridge, the filter unit, according to the invention, requires less construction space and weight, and saves costs.

According to a preferred embodiment, the auxiliary cartridge is disposed above the main cartridge. This results in a relatively compact design for the filter unit which only minimally exceeds the diameter of the main cartridge.

According to a further preferred embodiment, the inflow and the return flow of the auxiliary cartridge are disposed coaxially with the inlet and outlet of the filter unit. This results in a short and low-loss inflow and outflow for the auxiliary cartridge.

According to a further preferred embodiment, the fine filter has a grade of filtration of approximately 10 µm—which corresponds to the generally required specifications for the filtering of lubricating oil of marine transmissions.

According to a further preferred embodiment, the coarse filter has a grade of filtration of approximately 40 µm. The coarse filter is approximately four times coarser than the fine filter, and thus permits a corresponding smaller auxiliary cartridge, in comparison to the size of the main cartridge. Such a grade of filtration is sufficient to keep the lubricating oil free of coarse impurities during a duration of a few minutes.

According to a further preferred embodiment, the pressure loss in the auxiliary cartridge is set to the same threshold value as the pressure loss in the main cartridge in the case of a contaminated fine filter, at which the differential pressure switch is activated and an alarm is triggered. This has the consequence that while the main filter is being changed, a continuous alarm sounds which is shut off only after switching back to fine filter operation.

According to an alternative embodiment, the differential pressure switch is switched such that the continuous alarm is triggered during actuation of the switching device, that is, when the switch lever is actuated. This alternative has the advantage of attaining greater reliability during filter changes because the alarm is triggered independently of the pressure decrease at the auxiliary filter.

According to a further aspect of the invention, in the case that the main filter, or respectively the main cartridge, is to be exchanged, the switching device is actuated, the oil supply to the main filter is interrupted and the oil to be filtered is supplied to the auxiliary cartridge having the coarse filter. Thus, the fine filtering is interrupted for a short time, that is, for the filter change, and is replaced by coarse filtering. This coarse filtering is sufficient in order to protect the transmission from damage.

According to a preferred embodiment, a continuous alarm is triggered during exchange of the main cartridge. This prevents the danger of forgetting to switch back to the fine filter operation after the filter change.

BRIEF DESCRIPTION OF THE DRAWINGS

An embodiment of the invention is illustrated in the drawings and is described in detail in the following, whereby other features and/or benefits may be derived from the description and/or the drawing. The drawings show.

DETAILED DESCRIPTION OF THE DRAWINGS

Figure 1:
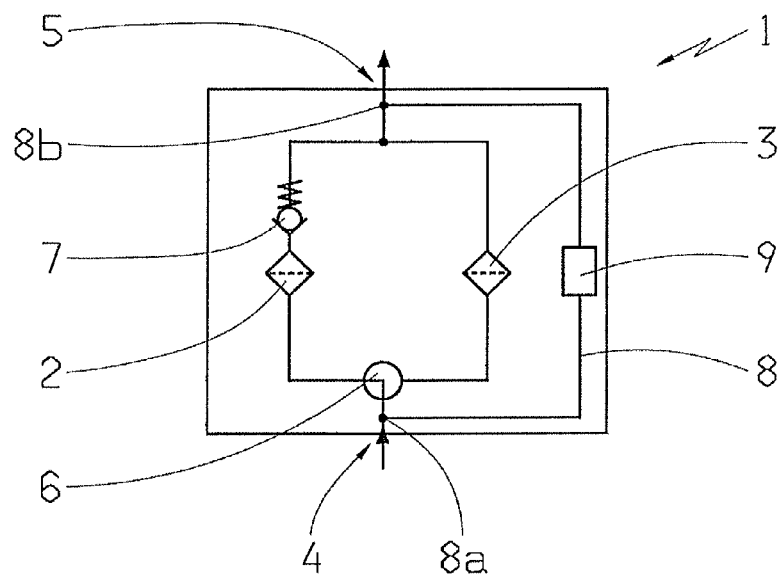
FIG. 1 a circuit diagram for the arrangement of the main and the auxiliary filter, FIG. 2 a filter unit during operation of the main filter, FIG. 3 the filter unit during operation of the auxiliary filter, and FIG. 4 a circuit arrangement for the differential pressure switch.

FIG. 1 shows a circuit diagram 1 having the arrangement of a main filter 2 and, in parallel, an auxiliary filter 3, also called protective filter 3. The circuit diagram 1 further shows an inlet 4, for a flow medium to be filtered, and an outlet 5. A switching device 6, which steers the flow medium through either the main filter 2 or the auxiliary filter 3, is disposed along the flow direction after the inlet 4. A non-return valve 7, which is open in the direction of the outlet 5 and is closed in direction of main filter 2, is disposed in the flow direction after the main filter 2. There is a measuring section 8, located between the inlet 4 and the outlet 5, having a first pressure sensor 8a and a second pressure sensor 8b for measuring the differential pressure between the inlet 4 and outlet 5, that is, either a pressure loss in the main filter 2 or in the auxiliary filter 3 is measured and supplied to a differential pressure switch 9. The differential pressure switch 9 can be coupled to an alarm device.

Figure 2:
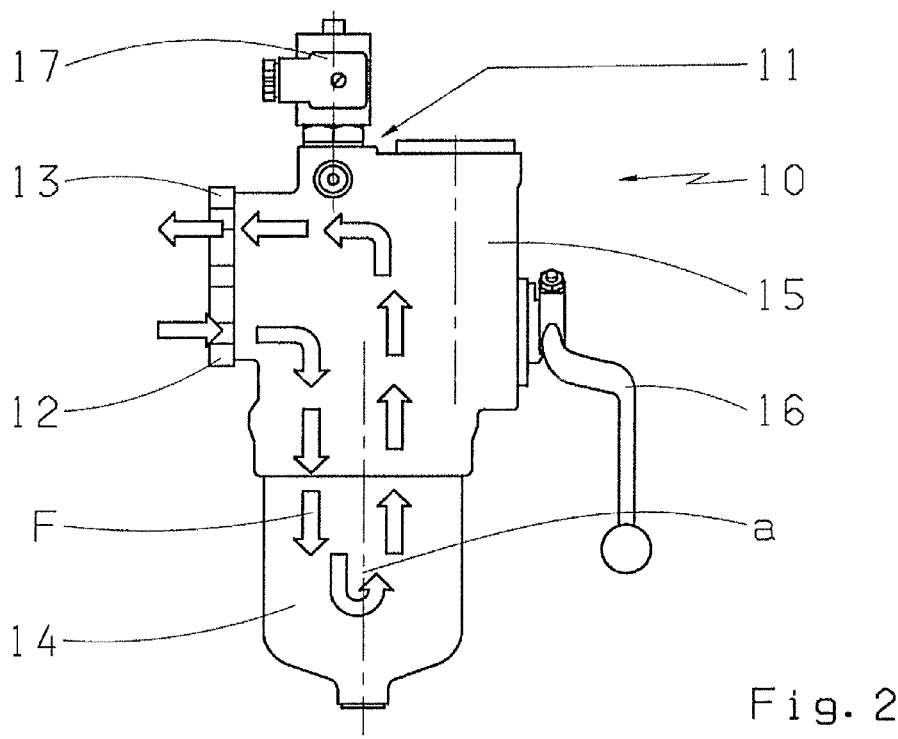

FIG. 2 shows a filter unit 10, implemented as a lubricating oil filter, having a filter housing 11 which has an inlet connection 12 and an outlet connection 13, also simply called inlet 12 and outlet 13. A main filter, implemented as a main cartridge 14, is connected to the filter housing 11, that is, it is interchangeably attached. A fine filter, not shown here, which filters the lubricating oil entering through the inlet connection 12, is disposed in the main cartridge 14, which has a longitudinal axis a. An auxiliary cartridge 15, which contains a coarse filter, not shown, is disposed above the main cartridge 14. The auxiliary cartridge 15 is substantially smaller and lighter than the main cartridge 14; in a preferred example embodiment, it has less than 40% of the volume of the main cartridge. The filter unit 10 further has a switching lever 16, which is part of a switching device, not shown in more detail. The filter unit 10 also has a differential pressure switch 17 which reacts to the pressure loss between the inlet 12 and the outlet 13, or the pressure loss in the main cartridge 14 or in the auxiliary cartridge 15. The shown filter unit 10 is preferably used as a lubricating oil filter for marine transmissions.

FIG. 2 shows the regular operation with the main filter 14, that is, fine filtering of the lubricating oil. The flow of the lubricating oil is represented by arrow F. The fine filter has a preferred grade of filtration of approx. 10 µm. The switching device 16 is set so that the entering lubricating oil flows through the main filter 14 while, at the same time, the auxiliary filter, or the auxiliary cartridge 15, is blocked for through flow. The lubricating oil is fine filtered. The pressure loss is continuously measured and further transmitted to the differential pressure switch 17 which, upon reaching a predetermined threshold value, reacts and triggers an alarm. As a rule, the threshold value is attained when the fine filter in the main cartridge 14 is contaminated.

Figure 3:
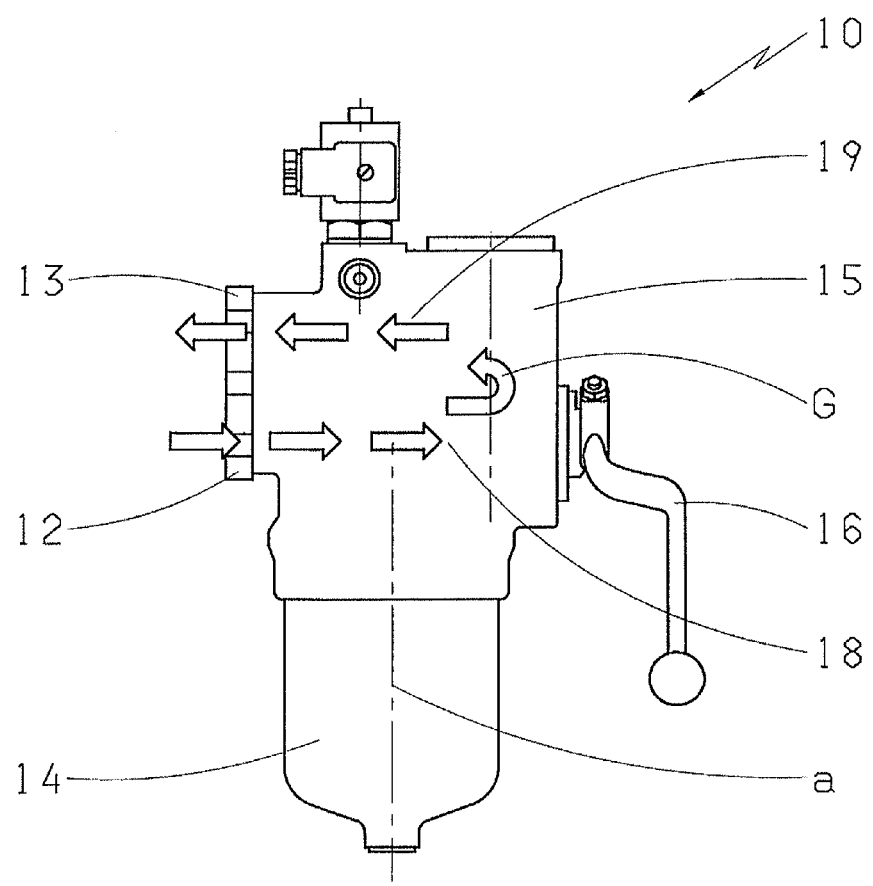

FIG. 3 shows the filter unit 10 after actuation of the switching device 16, and particularly in the manner that the main cartridge 14 is blocked, for a through flow, and is bypassed. The lubricating oil flows through the auxiliary cartridge 15, according to the flow arrows G, which has an inlet opening 18 and an outlet opening 19, which are disposed approximately coaxial to or aligned with the inlet connection 12 and the outlet connection 13 of the filter unit 10. Thus, the oil flow circulates above the main cartridge 14, with respect to the longitudinal axis a thereof.

The coarse filter, disposed in the auxiliary cartridge 15, has a grade of filtration of approx. 40 µm, thus approximately four times coarser than the fine filter in the main cartridge 14.

According to a preferred embodiment, the pressure drop in the main cartridge 15 is set so that the threshold value, which triggers the alarm, is always exceeded during coarse filtering. In this respect, there is a continuous alarm while changing the main cartridge 14. With this, after changing the main cartridge 14, or the fine filter located therein, it is intended that the switching of the switching device 16 is not forgotten, that is, moving the switching lever 16 such that fine filtering occurs again according to FIG. 2. The filter changes takes approximately 3-5 minutes so that the time duration, of coarse filtering, is relatively short, and thus, noncritical.

Figure 4:
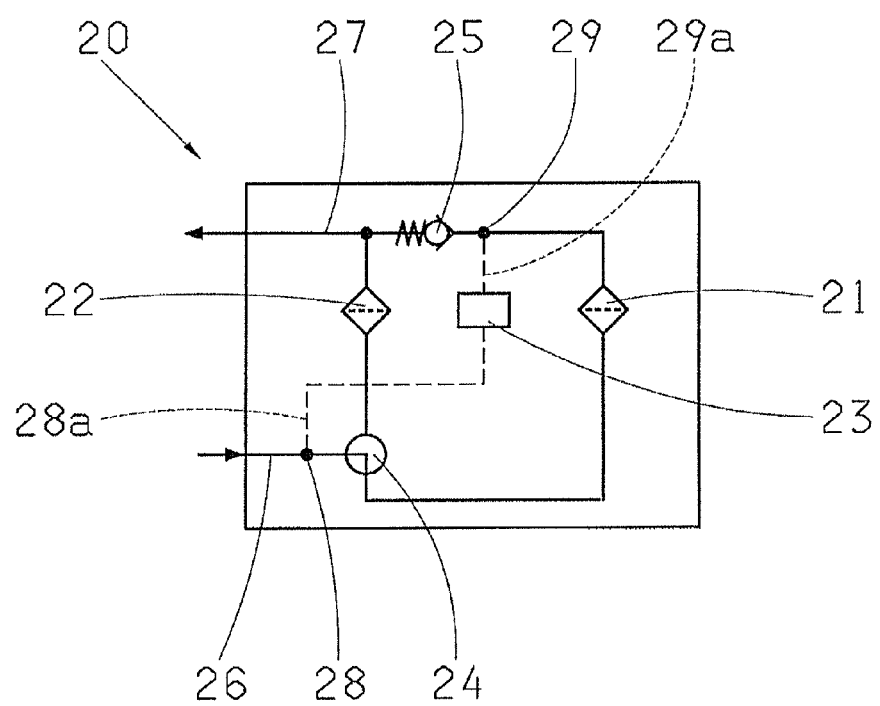

FIG. 4 shows a further circuit arrangement 20 for a main filter 21, an auxiliary filter 22, a differential pressure switch 23, a switching device 24, and a non-return valve 25. An inlet line, for the flow medium, is indicated with 26 and an outlet line is indicated with 27. The main filter 21 and the auxiliary filter 22 are connected, in parallel, between the inlet line 26 and the outlet line 27, wherein the switching device 24 steers the flow medium either via the main filter 21 or via the auxiliary filter 22. A first pressure sensor 28, in the inlet line 26, and a second pressure sensor 29, between the main filter 21 and the non-return valve 25, are inputted to the differential pressure switch 23 and, in each case, are connected by pressure lines 28a, 29a to the differential pressure switch 23.

In the example embodiment shown, the switching device 24 is set so that the flow medium flows through the main filter 21. The differential pressure switch 23 measures the pressure loss of the main filter 21 and upon attaining a threshold value, which corresponds to a defined degree of contamination of the main filter 21, triggers an alarm. When the main filter 21 is to be changed, the switching device 24 is switched, preferably using a switch lever 16, represented in FIG. 3, so that the flow medium flows through the auxiliary filter 22, implemented as a coarse filter. Thus, the main filter 21 is blocked. When this occurs, the differential pressure switch 23 now measures only the pressure present at the pressure sensor 28, in the inlet line 26, which is higher than the pressure loss at the main filter 21 occurring in the case of contamination, such that a continuous alarm is triggered. Only when the filter changes is completed and the switching device 24 is again switched back to normal operation, is the alarm shut off. Using this circuit variant, it is guaranteed that a continuous alarm is always triggered with movement of the switch lever of the switching device 24, and particularly, independently of the pressure decrease in the auxiliary filter 22.

REFERENCE CHARACTERS

1 Circuit diagram
2 Main filter
3 Auxiliary filter
4 Inlet
5 Outlet
6 Switching device
7 Non-return valve
8 Measuring section
8a first pressure sensor
8b second pressure sensor
9 Differential pressure switch
10 Filter unit
11 Filter housing
12 Inlet connection
13 Outlet connection
14 Main cartridge
15 Auxiliary cartridge
16 Switching lever/device
17 Differential pressure switch 18 Inlet opening
19 Outlet opening
20 Switch arrangement
21 Main filter
22 Auxiliary filter
23 Differential pressure switch
24 Switching device
25 Non-return valve
26 Inlet valve
27 Outlet line
28 First pressure sensor
28a Pressure line
29 Second pressure sensor
29a Pressure line
a Longitudinal axis main cartridge
F Flow arrow (fine filtering)
G Flow arrow (coarse filtering)

The invention claimed is:

1. A filter unit comprising:
an inlet (12) and an outlet (13) for a flow medium to be filtered,
a first filter cartridge (14) having a first filter element,
a second filter cartridge (15) having a second filter element, and
a switching device (16) for facilitating an alternating filter operation of the first or the second filter cartridge (14, 15),
the first filter cartridge being implemented as a main cartridge (14) and the first filter element being implemented as a fine filter which provides a fine filtering operation,
the second filter cartridge being implemented as an auxiliary cartridge (15) and the second filter element being implemented as a coarse filter which provides a coarse filtering operation,
a differential pressure switch (9) having a first and second pressure sensor (8a, 8b) being assigned to a main filter (2), implemented as the main cartridge (14), and, upon exceeding a predetermined pressure loss, the differential pressure switch triggering an alarm,
wherein the pressure loss in the auxiliary cartridge is set to a same threshold value as the pressure loss in the main cartridge with a contaminated fine filter, at which the differential pressure switch reacts and triggers an alarm such that, during changing of the main filter, the pressure loss of the flow medium flowing through the coarse filter of the second filter element, when the course filter is in a clean state, causes the differential pressure switch to continue triggering the alarm, and the differential pressure switch only discontinues triggering of the alarm once the first filter cartridge is replaced and the flow medium again flows through the first filter cartridge at a reduced pressure loss following changing the filtering back to the fine filtering operation.

2. The filter unit according to claim 1, wherein the first pressure sensor (8a) of the differential pressure switch (9) is disposed at the inlet (4), upstream of the switching device (6), and the second pressure sensor (8b) is disposed at the outlet (5).

3. The filter unit according to claim 1, wherein the fine filter has a grade of filtration of approximately 10 μm.

4. The filter unit according to claim 1, wherein the coarse filter has a grade of filtration of approximately 40 μm.

5. The filter unit according to claim 1, wherein the second filter cartridge has a volume which is less than 40% of a volume of the first filter cartridge.

6. The filter unit according to claim 1, wherein the auxiliary cartridge has inlet and outlet openings for the flow medium, which are respectfully disposed coaxially with the inlet and the outlet of the filter unit.

7. The filter unit according to claim 1, wherein a grade of filtration of the auxiliary cartridge is approximately 40 μm which is four times coarser than a grade of filtration of the main cartridge so as to facilitate a correspondingly smaller volume of the auxiliary cartridge in comparison to a volume of the main cartridge.

8. The filter unit according to claim 1, wherein the auxiliary cartridge has inlet and outlet openings for the flow medium which are respectfully disposed coaxially with the inlet and the outlet of the filter unit.

9. A method of operating a filter unit (10) comprising an inlet (12) and an outlet (13) for a flow medium to be filtered, a first filter cartridge (14) having a first filter element, a second filter cartridge (15) having a second filter element, a switching device (16) for facilitating an alternating filter operation of the first or the second filter cartridge (14, 15), the first filter cartridge being implemented as a main cartridge (14) and the first filter element being implemented as a fine filter which provides a fine filtering operation, the second filter cartridge being implemented as an auxiliary cartridge (15) and the second filter cartridge having a volume which is less than 40% of a volume of the first filter cartridge, and the second filter element being implemented as a coarse filter which provides a coarse filtering operation, a differential pressure switch (9) having a first and second pressure sensor (8a, 8b) being assigned to a main filter (2), implemented as the main cartridge (14), and, upon exceeding a predetermined pressure loss, the differential pressure switch triggering an alarm, wherein the pressure loss in the auxiliary cartridge is set to a same threshold value as the pressure loss in the main cartridge with a contaminated fine filter, at which the differential pressure switch reacts and triggers an alarm such that during changing of the main filter, a continuous alarm sounds and is only switched off after changing the filtering back to the fine filtering operation, the method comprising the steps of:
actuating the switching device (16) during changing of the main cartridge (14) so that the flow medium only flows through the auxiliary cartridge (15) and the coarse filtering operation occurs,
continuous actuating the alarm during flow of the flow medium only through the auxiliary cartridge (15),
assigning the differential pressure switch (9, 23), with the first and the second pressure sensor (8a, 8b; 28, 29), to the main filter (3, 21), and the differential pressure switch triggering the alarm upon exceeding the predetermined pressure loss,
setting the pressure loss in the auxiliary cartridge to a same threshold value as the pressure loss in the main cartridge with a contaminated fine filter, at which the differential pressure switch reacts and triggers the alarm such that, during changing of the main filter, the pressure loss of the flow medium flowing through the coarse filter of the second filter element, when the course filter is in a clean state, causes the differential pressure switch to continue triggering the alarm, and the differential pressure switch only discontinues triggering of the alarm once the first filter cartridge is replaced and the flow medium again flows through the first filter cartridge at a reduced pressure loss after the switching device (16) is switched back to the fine filtering operation.

10. A filter unit comprising:
an inlet (12) and an outlet (13) for a flow medium to be filtered, a main filter having a first filter element,
an auxiliary filter having a second filter element,
a switching device (16) for facilitating switching filter operation between the main and the auxiliary filters,
the first filter element being a main cartridge (14) which is a fine filter for providing a fine filtering operation,
the second filter element being an auxiliary cartridge (15) which is a coarse filter for providing a more coarse filtering operation than the first filter cartridge,
a differential pressure switch (9) having a first pressure sensor (8a, 8b) located adjacent the inlet (12) while a second pressure sensor (8b) being located adjacent the outlet (13) and, upon the main filter exceeding a predetermined pressure loss, the differential pressure switch triggering an alarm,
wherein a pressure loss in the auxiliary cartridge is set to a same threshold value as a pressure loss in the main cartridge with a contaminated fine filter, so that the pressure loss of the flow medium flowing through the coarse filter of the second filter element, when the course filter is in a clean state, causes a differential pressure to continue triggering the alarm, and the differential pressure switch only discontinues triggering of the alarm once the first filter cartridge is replaced and the flow medium again flows through the first filter cartridge at a reduced pressure loss following changing the filtering back to the fine filtering operation, and
the auxiliary cartridge has inlet and outlet openings for the flow medium, which are disposed coaxially to the inlet and the outlet of the filter unit.

\* \* \* \* \*